United States Patent [19]

Muller

[11] Patent Number: 4,969,091
[45] Date of Patent: Nov. 6, 1990

[54] APPARATUS FOR STACK CONTROL EMPLOYING MIXED HARDWARE REGISTERS AND MEMORY

[76] Inventor: Otto Muller, Am Guckenbuhl 10, D-7750 Konstanz 16, Fed. Rep. of Germany

[21] Appl. No.: 228,528

[22] Filed: Aug. 4, 1988

[30] Foreign Application Priority Data

Aug. 6, 1987 [DE] Fed. Rep. of Germany ....... 3726192

[51] Int. Cl.$^5$ .................... G06F 13/00; G06F 13/12
[52] U.S. Cl. .................. 364/200; 364/244.3; 364/245.1; 364/247; 364/247.7
[58] Field of Search ... 364/200 MS File, 900 MS File

[56] References Cited

U.S. PATENT DOCUMENTS

| | | | |
|---|---|---|---|
| 3,889,243 | 6/1975 | Drimak | 340/172.5 |
| 4,217,638 | 8/1980 | Namimoto et al. | 364/200 |
| 4,268,903 | 5/1981 | Miki et al. | 364/200 |
| 4,297,743 | 10/1981 | Appell et al. | 364/200 |
| 4,313,161 | 1/1982 | Hardin et al. | 364/200 |
| 4,399,507 | 8/1983 | Cosgrove et al. | 364/200 |
| 4,410,939 | 10/1983 | Kawakami | 364/200 |
| 4,517,640 | 5/1985 | Hattori et al. | 364/200 |
| 4,524,416 | 6/1985 | Stanley et al. | 364/200 |
| 4,680,698 | 7/1987 | Edwards et al. | 364/200 |
| 4,704,679 | 11/1987 | Hassler et al. | 364/200 |

*Primary Examiner*—Raulfe B. Zache
*Assistant Examiner*—Glenn Richman
*Attorney, Agent, or Firm*—Christie, Parker & Hale

[57] ABSTRACT

A mixed hardware register and memory architecture is provided by the present invention to maintain the advantage of variable length stack frames while eliminating the requirement for a stack pointer. The invention includes a global register bank and a stack register bank with two independent address means for addressing the global and stack register banks. Registers are provided as temporary memories for the source operand and destination operand, and a second data path is provided for transfer of data words directly from memory to the local and global registers. The frame pointer is incorporated as a portion of the status register present in the global register bank. Storage of the status register on a call instruction and restore of the status register in a return instruction automatically stores the frame pointer providing the elimination of a hardware register and one cycle in both call and return instructions over prior art devices. The register to register architecture of the invention allows elimination of the stack pointer and stack instructions such as push and pull are unnecessary resulting in a compact instruction set.

16 Claims, 3 Drawing Sheets

Fig. 2

APPARATUS FOR STACK CONTROL EMPLOYING MIXED HARDWARE REGISTERS AND MEMORY

BACKGROUND OF THE INVENTION

1. Field of the Invention

The present invention relates to the manipulation and control of data structures. More particularly the invention provides stack control through a plurality of individually addressable hardware registers used in combination with memory to provide multiple variable length stack frames.

2. Prior Art

The stack as a data structure where new data can be appended or data deleted is well known in the prior art. In block-oriented higher programming languages, such as PL1, PASCAL, Modula-two, and Ada, this data structure, which is known in these applications as run time stacks, is used to pass parameters at subroutine calls and to create a new generation of local variables for the called subroutine in addition to those variables generated by the calling routine. This new stack generated by the call is known as the activation record or stack frame. Parameters passed from the calling routine to the called subroutine may also be addressed as local variables from within the new stack relative to a frame pointer. The instruction counter, frame pointer and contents of the status register in the calling routine are stored at an address indicated by a stack pointer. The stack pointer indicates the end of a stack frame. A frame instruction increments the stack pointer as required by a new stack frame to accommodate the required local variables needed in the new stack frame. If necessary the frame pointer may be decremented to point to the beginning of the passed parameters.

A return instruction restores the old status by returning the frame pointer to the beginning of the old stack.

Figures 1A, 1B:
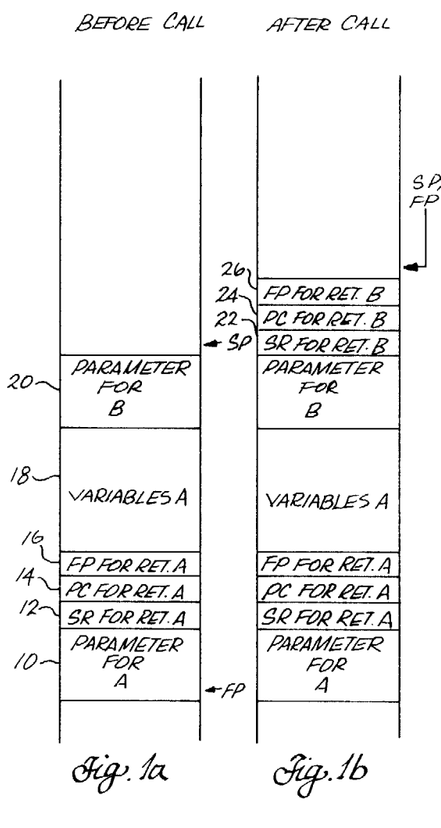
FIG. 1A provides a representation of memory locations before a call instruction for a prior art stack in memory configuration.
FIG. 1B demonstrates the stack configuration after a call instruction for the prior art stack in memory configuration.

A typical implementation of a stack in memory as known in the prior art is shown in FIGS. 1A through 1D. FIG. 1A demonstrates the location of the frame pointer FP and stack pointer SP prior to a call for subroutine B. Included in the first stack frame defined by the frame pointer and stack pointer are memory locations defining parameter(s) for subroutine A at location 10. The status register for return from subroutine A is stored at location 12. The program counter for return from subroutine A is stored at location 14. The frame pointer for return from subroutine A is stored at location 16. The variables for subroutine A are stored at location(s) 18 and the parameters for subroutine B at location(s) 20.

A call of subroutine B is accomplished by storing the current status register at the address designated by the stack pointer, incrementing the stack pointer, storing the program counter at the location designated by the stack printer, incrementing the stack pointer and storing the frame pointer location at the location designated by the stack pointer, and again incrementing the stack pointer. The program counter is then set to the jump address and the frame pointer is set to the stack pointer. As shown in FIG. 1B the status register for return from subroutine B is stored in location 22. The program counter for return from subroutine B is stored in location 24 and the frame pointer for return from subroutine B is stored in location 26. At the completion of these operations, the frame pointer and stack pointer are co-located at the next storage location.

Figure 1C:
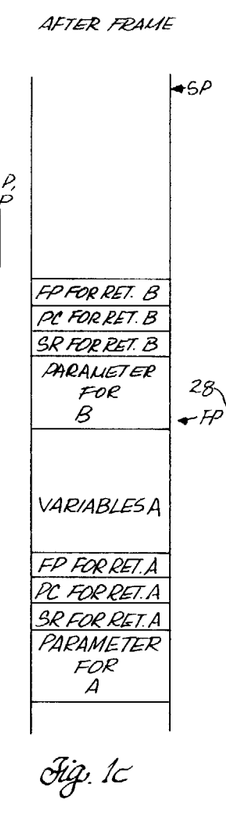
FIG. 1C shows the configuration of the stack after a frame instruction in the prior art stack in memory configuration.

To accommodate variables for subroutine B, a frame instruction is employed incrementing the stack counter by a number of bytes equal to the number of variables for frame B and decrementing the frame pointer by the number of parameter bytes for frame B. The resulting frame pointer and stack pointer locations after the frame instruction are shown in FIG. 1C.

Figure 1D:
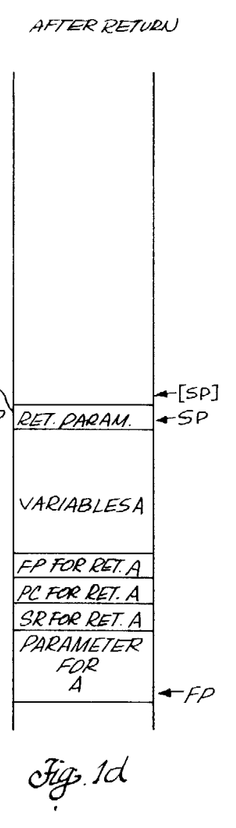
FIG. 1D is a representation of the memory locations after a return instruction for the prior art stack in memory configuration.

Return from subroutine B is accomplished by decrementing the stack pointer by the number of bytes incremented for variable storage, setting the frame pointer equal to the value in the location addressed by the stack pointer, decrementing the stack pointer, setting the program counter equal to the value in the location designated by the stack pointer, decrementing the stack pointer, setting the status register equal to the value of the location designated by the stack pointer, and decrementing the stack pointer by the number of parameter bytes established for frame B. The final decrementing of the stack pointer may optionally exclude a number of return parameter bytes provided to the A subroutine. The status of the stack pointer and frame pointer after return is shown in FIG. 1D wherein location [SP] is the optional stack pointer location when return parameters are provided in location(s) 28.

The following definitions allow reduction of processing steps to equation form. Machine embodiments in the prior art and for the present invention to be subsequently described are based on a 32 bit architecture with bit 0 defined as the least significant and bit 31 as the most significant bit.

Operand [x .. y] denotes bits x through y of an operand. Example: MP[8 .. 2] denotes bits 8 through 2 of the memory pointer.

The symbol := signifies the assignment symbol read as "is replaced by." Expression ∧ denotes an operand which is addressed by the value of the expression. Depending on the context the expression addresses a memory location or a local register. For example, (SP) ∧ := SR denotes replacement of the memory location designated by the value in the stack pointer with the value in the status register. $>, > =, <$, denote the "greater than," "greater or equal," and "less than" relations.

In equation format the call, frame and return instructions of the prior art configurations are represented as:

Call B
(SP)∧ := SR; SP := SP+4;
(SP)∧ := PC; SP := SP+4;
(SP)∧ := FP; SP := SP+4;
PC := jump-address
FP := SP;
Frame in B
SP := SP+n;
FP := FP−p;
n = number variable bytes for frame B
p = number parameter bytes for frame B
Return from B
SP := SP−n;
FP := (SP)∧, SP := SP−4;
PC := (SP)∧ ; SP := SP−4;
SR := (SP)∧ ; SP := SP−4−p+[r];
r = number return parameter bytes
[r] is optional A number of disadvantages exist in the prior art as described. Most notably, parameters must be stored on the stack by the calling routine and restored from the stack by the called subroutine. This requires double memory traffic due to the read/write requirements. In addition, many of the calling subroutine registers are normally saved on the stack either by the calling subroutine itself or by the called subroutine and then restored upon return. Again significant memory traffic is required.

The following modifications to the described "stack in memory" have been employed in the prior art singly or in combination:

1. The stack is addressed in descending order;
2. The status register is not saved when calling internal subroutines;
3. Past parameters are addressed through negative displacement relative to the frame pointer as opposed to decrementing the frame pointer;
4. The contents of the status register program counter and frame pointer are saved and restored in an alternate sequence;
5. The stack pointer designates the last valid value in the stack instead of the first unused address;
6. The local variables and past parameters are not addressed relative to the frame pointer but relative to the stack pointer allowing elimination of the frame pointer. However, this method has the additional disadvantage that an alteration of the stack pointer for storage of temporary results also changes the relative address.
7. The stack pointer is set to the value needed by the called subroutine by the calling routine eliminating the requirement for a frame instruction in the called subroutine. This method has the serious disadvantage that precompiled subroutines cannot be linked to calling routines without being recompiled to allow sequential adjustment of the stack frame length for the called subroutine in the calling routine.

Several prior art method and architectures exist to eliminate the disadvantages of the "stack in memory". In one such architecture the stack is implemented entirely in hardware through the use of registers in the CPU. This method is rarely employed since maximum stack size is severely limited by the available number of registers. Further, in a multi-tasking environment several stacks are required which must either be exchanged from memory or held in additional hardware register sets.

A second approach employs dividing the stack into a register part and a memory part. Only the top of the stack, that is, the recent or most recent stack frames, are held in registers while older stack frames are held in the memory part of the stack. If insufficient space exists in the register set when a new stack frame is created, the contents of the registers of the oldest register stack frame are stored into the memory part of the stack. The number of stored registers is required to be at least equal to the number of registers additionally required for the new stack frame. The memory address of the registers to be stored is held in a memory pointer which designates the upper most free address of the memory part of the stack. The memory pointer is incremented when registers are stored.

Operation of this mixed memory and register implementation is essentially the same as the standard method previously described with respect to FIGS. 1A through 1D; however, the following disadvantages are present.

Three words for the status register program counter and frame pointer must be stored as return information by the call instruction into the stack registers and must be restored into the corresponding special registers (the status register, program counter and frame pointer register themselves) by a return instruction. Since typically only one arithmetic logic unit (ALU) is employed due to cost considerations, usually only one word per cycle may be transferred, thus requiring three cycles.

Further, variation 6 listed above may not be implemented since the frame pointer is required to check for underflow of the register portion of the stack on a return instruction.

In addition, to implement the mixed register and memory stack, a stack pointer which must be controlled by additional hardware is also necessary even though the most recent stack frame relative to the frame pointer can be addressed and treated like hardware registers. In a register-register architecture no stack is necessary for the computation of intermediate results such as parenthesis reduction and loops because intermediate results are not stored at the top of the stack but in explicitly denoted registers defined during compiling.

In a final implementation existing in the prior art a mixed memory and register configuration is again employed; however, single stack frames have fixed length. The number of past parameters and variables is fixed independent of the number actually required. Control of the stack is therefore very easy. The frame pointer is simply incremented at the call instruction or decremented at the return instruction and does not need to be stored. The stack pointer is also unnecessary and therefore omitted. The disadvantage of this elegant and simple method is the waste of unused registers. In order to provide sufficient registers for maximum stack size, average register use of approximately 50% results. This approach is highly discussed in the literature but rarely used in practice.

SUMMARY OF THE INVENTION

The present invention employs a mixed hardware register and memory architecture which maintains the advantage of variable length stack frames while eliminating the requirement for a stack pointer. The invention comprises a global register bank including a status register, program counter, memory pointer, lower stack bound register, and upper stack bound register, and a register providing a difference counter. The status register includes a 7 bit frame pointer and a 4 bit frame length.

In the present embodiment corresponding to the 7 bit frame pointer length, 64 hardware registers are provided for a stack register bank. Sixteen registers are locally addressable on a relative basis to the 6 least significant bits of the frame pointer. Absolute addressing is provided by summing the frame pointer value with a register code value modulo 64.

Two independent address means are employed for addressing registers in the global and stack register banks to define location of the source and destination for input and output to the arithmetic logic unit. A first register is provided as a temporary memory for the source operand and a second register is provided as a temporary memory for the destination operand. A secondary data path is provided for transfer of data words directly from memory into the local and global registers.

The computation for comparison of the frame pointer with the memory pointer only requires that the frame pointer represent an integer range equal to double the number of registers in the register portion of the stack. In the present embodiment with the stack register bank containing 64 registers the frame pointer must represent a range of 0 to 127 which is a 7 bit binary number.

As previously mentioned, the limitation of the frame pointer to 7 bits allows incorporation of the frame pointer as a part of the status register. The storage of the status register on a call instruction and the restore of the storage register in a return instruction therefore automatically stores the frame pointer. This allows a double benefit by eliminating a hardware register for storage of the frame pointer and elimination of one cycle in both the call and return instructions resulting in a 33% savings of controlled registers in a stack frame.

A second advantage of the short length of the frame pointer is the capability to increment and decrement the frame pointer during call and return instructions respectively using the existing register address calculation means as previously described. This allows the 32 bit ALU to work in parallel saving further cycles.

In addition the present invention eliminates the need for a stack pointer. The register-register architecture of the invention allows this essential simplification since only register instructions and memory instructions need to be implemented. Stack instructions such as push and pull are unnecessary. The resulting more compact instruction set provides very simple control which is particularly useful in fast reduced instruction set computers (RISC). The first task of the stack register, keeping track of intermediate results, is omitted by the use of the register-register architecture. The second task of the stack pointer, evaluation of the new start address of a new stack frame, is a unique solution of the present invention. A frame instruction determines only the maximum length of the actual stack frame. In the general case, a call instruction appends a new stack frame by determining the beginning of the new stack frame within the limits of the recent stack frame rather than at the maximum length of the recent stack frame. This technique is distinguishable and an improvement over the prior art method designated 7, described previously, where the length of a new stack generation is determined by a call instruction according to the needs of the called subroutine.

In addition to elimination of the stack pointer, a distinct advantage of the present invention is that a new stack frame is positioned with respect to the calling stack frame based on only the variables actually used and the optional past parameters. Therefore the new stack generation is typically appended to a stack at a position substantially shorter than the maximum length.

The present invention as described employing a stack register bank of only 64 registers accomplishes the same effect as conventional methods with a register set of twice the size. This results in significant savings of surface on a silicone chip and shorter register read and write times due to reduced capacitances. Cycle times are therefore substantially shortened. Reading, processing and writing back results in the registers requires only one very short cycle in the present invention as opposed to longer register read and write operations which must be divided into several cycles in conventional implementations. Further, use of a reduced number of registers per stack frame in a multi-tasking environment reduces the number of registers which must be stored into the memory and restored during task changes in the CPU.

DETAILED DESCRIPTION OF THE INVENTION

Figure 2:
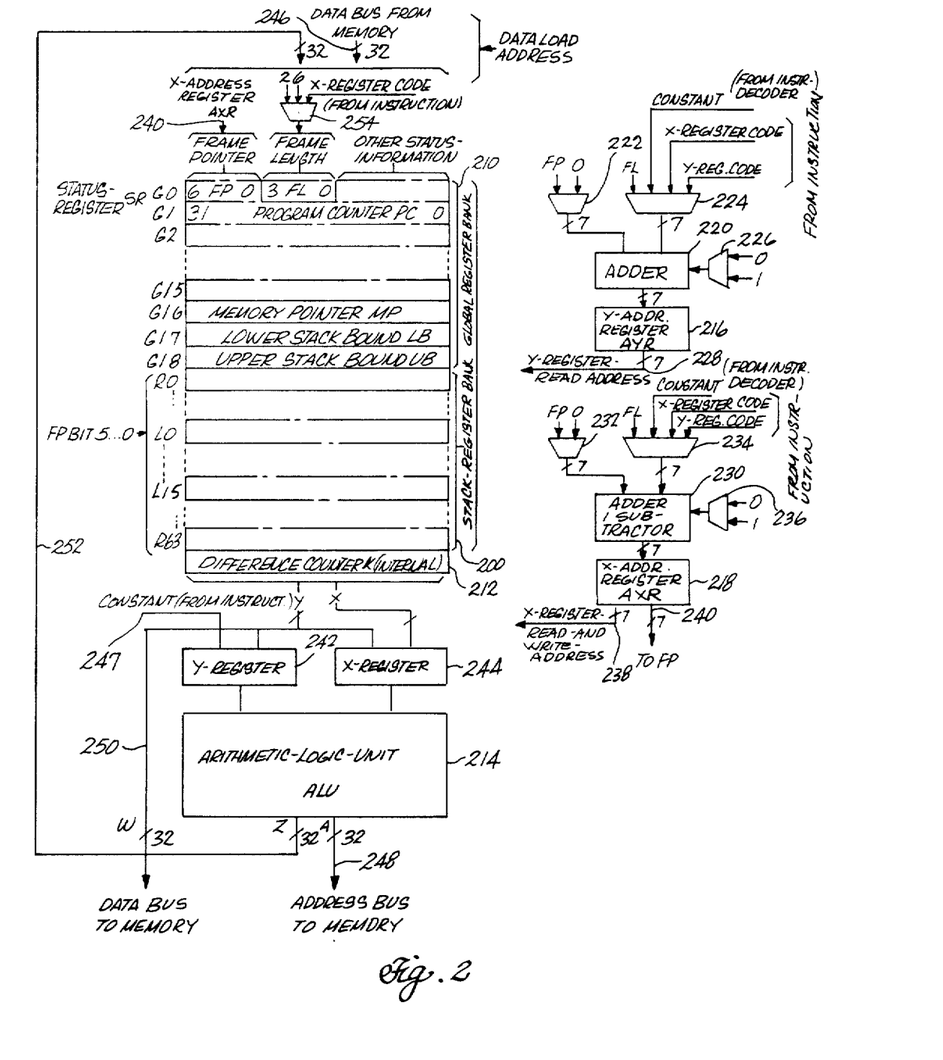
FIG. 2 is a block diagram representation of the hardware architecture of the present invention employing a global register bank, stack register bank, addressing means and arithmetic logic unit.

An embodiment of the invention employed in a 32 bit computer is shown in block diagram form in FIG. 2. A stack register bank 200 comprises 64 hardware registers R0 through R63. These registers form the register portion of the stack. These registers are addressed as local registers, relative to bits 5 through 0 of the frame pointer FP, resident in the status register as will be described in greater detail subsequently. Addressing of local registers employing the six bits of the frame pointer allows a maximum actual stack frame of 16 registers which are addressed as local registers via the register code of an instruction. The local registers are represented for a given stack frame as L0 through L15 in FIG. 2. The absolute stack address is evaluated with the formula $$\text{absolute address:} = (FP + \text{register code}) \text{ modulo } 64$$

where FP in the formula represents the contents of the frame pointer. Employing modulo 64 arithmetic means absolute address 0 follows absolute address 63 as a wrap around therefore relative addresses may be considered as sequentially ascending. A global register bank 210 contains 19 global registers G0 through G18 which may be addressed via the register code of an instruction. Registers G16 through G18 are addressed thorough a special instruction by way of a double word move.

Register G1 is the program counter. The program counter is updated by a control unit (not shown) to the address of the next instruction if no branch is present or loaded with a branch target address if a branch is required. Global register G16 is the memory pointer which contains the address of the first free memory location in the memory portion of the stack. This location which is the top of the memory stack is the address at which the first stack register absolutely addressed by memory pointer bits 7 through 2 would be saved by a frame instruction in case of an overflow of the register portion of the stack. Global register G17 contains the lower stack bound LB which represents the address of the lowest memory stack location. The LB is referenced by a return instruction to inhibit stack underflow.

Register G18 contains the upper stack bound UB which represents the address of the highest memory stack location. UB is referenced by the frame instruction to inhibit stack overflow.

Register G0 is the status register. Bits 20 through 0 contain information known to those skilled in the art normally required for operation of the central processing unit such as condition bits (C, Z, V and N), several mode bits and an instruction length counter ILC in bits 20 and 19 which indicates the length in 1 to 3 half words of the last executed instruction. Bits 31 through 25 of the status register contain the 7 bit frame pointer as previously described. The least significant six bits of the frame pointer designate the beginning of the current stack frame, local register L0, as previously described. The frame pointer is equal to bits 8 through 2 of the memory stack address at which the contents of L0 would be stored if pushed onto the memory portion of the stack. Bits 24 through 21 of the status register contain the maximum frame length FL. The frame length FL defines the maximum number of local registers usable in the frame including passed parameters, the stored return status register and stored return program counter. FL=0 is interpreted as FL=16.

Global registers G2 through G15 are used for central processing unit functions as known to those skilled in the art.

A difference counter K 220 is an internal 9 bit counter. Only bits 8 through 0 are implemented as counter bits with bits 31 through 9 set equal to the sign bit 8 when the value of the counter K is read. Bits 1 and 0 are always set to 0. The contents of bits 8 through 2 of the difference counter contain the negated number of the stack register words which must be pushed onto the memory portion of the stack by a frame instruction or pulled from the memory portion of the stack by a return instruction.

A 32 bit arithmetic logic unit (ALU) 214 processes the source (y) and destination (x) operands arithmetically or logically including shift. The result may be stored in the destination register x.

A means is provided for addressing the y and x registers separately by way of a y address register AYR 216 and an x address register AXR 218. The y address register is loaded by an adder 220, having inputs from a first multiplexer 222 selecting between a zero value and the value in the frame pointer, a second multiplexer 224 selecting between the value in the frame length, a constant from the instruction decoder, or an x register code or y register code from the instruction. A third multiplexer 226 provides a 0 or 1 input to the adder. The output 228 of AYR provides addressing for the source register.

Similarly, for the x address register, the address input is provided by an adder/subtracter 230 receiving inputs from a second plurality of multiplexers. A first multiplexer 232 selects between a 0 value and the value of the frame pointer. A second multiplexer 234 selects between the frame length, a constant from the instruction decoder, or the x register code or y register code from an instruction. A third multiplexer 236 provides a 0 or 1 input.

A first output 238 from the x address register designates a read/write address for the destination register. A second output 240 is connected to the frame pointer to allow incrementing or decrementing the frame pointer as previously described by way of the x address register independent of the arithmetic logic unit.

The address calculated in the adder 220 and adder 230, for the source and destination register addresses respectively, in the decode cycle are latched into the y address register and x address register respectively to provide the source and destination registers for the execution cycle.

Temporary memory for the source or y operand and the destination or x operand are provided in registers 242 and 244 respectively. Data words may be transferred directly from memory to both the local and global registers by way of the data bus 246. The y register and x register provide storage of source and destination contents for processing by the arithmetic logic unit. The y register or source may be loaded as a constant from the instruction on bus 247. Communication from the arithmetic logic unit to the memory is provided on bus 252 for data and bus 248 for addressing of the memory.

The contents of the source register may be provided directly to memory on data bus 250. Results calculated by the arithmetic logic unit are provided to the destination register on data bus 252.

Setting of the frame length value is accomplished through multiplexer 254 which selects between default values of 2 and 6 as will be described subsequently, or a frame length value contained in the x register code from the instruction.

The operation of the invention configured as shown in FIG. 2 is best described by analysis of standard instructions for call, trap, frame, return, and set stack address. Upon initiation of a call instruction which is used to jump to a subroutine, the jump address is placed in the program counter and the x register code from the instruction is loaded into the frame length bits in the status register through multiplexer 254. The old status register is then loaded into the stack in the register addressed by the added value of the frame pointer and frame length, modulo 64. The old program counter is loaded into the stack in the register addressed by the sum of the value in the frame pointer plus the frame length plus 1 modulo 64. The addends for the register address are provided through the first, second and third multiplexers connected to the adder for the respective address register as previously described.

The old status register and program counter represent the status at the beginning of the call instruction. The old contents of the program counter and status register are maintained in registers which always contain a copy of the status register and program counter at the beginning of the instruction. The old contents of the program counter contains the return address used by the return instruction which will be discussed in greater detail subsequently. The old contents of the status register contain all information necessary for restoring the return status, especially the frame pointer and frame length of the old stack frame.

The value of the frame pointer in the stack created for the subroutine is incremented by the value of the frame length wherein frame length equal to 0 is interpreted as frame length equals 16. The frame length is then set to 6 employing multiplexer 254 to create a new stack frame. The saved status register from the old stack frame can be addressed from the new stack frame as local register L0, and the saved program counter as local register L1. Setting the frame length to 6 provides registers L2 through L5 for any use by the subroutine. The value of the x register code must not exceed the value of the frame length of the current stack frame for instructions in the subroutine called. Otherwise the data appended to the stack would extend beyond the maximum length denoted by the frame length and the beginning of the register portion of the stack could be overwritten by mistake.

The call instruction does not check for a stack register overflow and therefore another call instruction must be preceded by a frame instruction. A frame instruction must also be executed if the stack frame must be restructured. For example, decrementing the frame pointer to access passed parameters requires a new maximum frame length as will be described in greater detail with respect to the frame instruction.

The selected default value for the frame length of 6 set by the call instruction is not usually equal to the maximum length needed by a new stack frame. However, if no parameters had been passed to the new subroutine and no additional subroutine is called, no frame instruction need be executed and a frame length of 6 is a good average for the maximum length. At a larger default value for frame length there would often be an excess of stack registers reserved resulting in unnecessary storage of registers into the memory portion of the stack. The corresponding representation of the call instruction is PC := jump address
FL := x register code
Register (FP+FL) ∧ := SR old
-- status of SR before call instruction
Register (FP+FL+1) ∧ := PC old
-- return address
FP := FP+FL
FL := 6

The call instruction as coded above in Pascal representation is executed in three cycles.

Figure 3A:
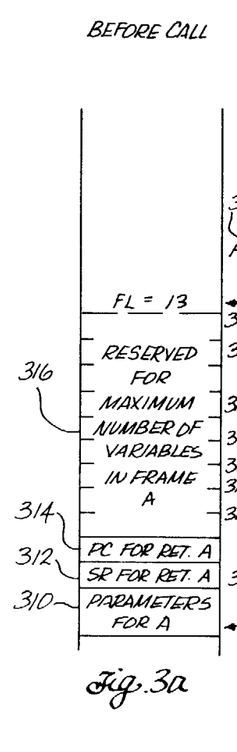
FIG. 3A is a representation of the contents of the stack register bank of the present invention prior to a call instruction.

The configuration of the register portion of the stack prior to a call instruction is shown in FIG. 3A. The frame pointer FP designates the locations in the stack 310 for parameters associated with the subroutine A. As will be subsequently described, these parameters may be located in the memory portion or register portion of the stack. The status register for the return from subroutine A is stored in location 312, while the program counter for return from subroutine A is stored in location 314. In the example shown, nine stack locations 316 have been reserved for variables in frame A. This total stack size results in a frame length of 13. The location in the stack designated by the value of the frame pointer plus the frame length is the next available location in the stack.

Figure 3B:
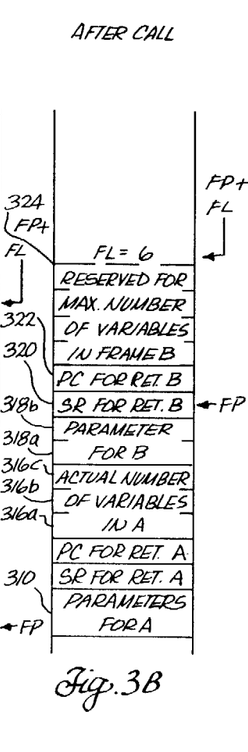
FIG. 3B is a representation of the stack register bank after a call instruction in the present invention.

If a call is made to subroutine B at a point where three actual variables exist in subroutine A, FIG. 3B represents the configuration of the stack upon completion of the call. The parameters for A still exist in locations 310 and the status register for return of routine A and program counter for return of routine A still reside in locations 312 and 314 respectively. Locations 316A, 316B and 316C contain the actual variables in subroutine A. Subroutine A has defined two parameters for transfer to subroutine B which are stored in locations 318A and 318B of the stack. Upon completion of the call, the frame pointer has been relocated to the value of the old frame pointer plus the actual frame length of subroutine A. The status register for return from subroutine B to subroutine A has been stored in location 320 while the program counter has been stored in location 322. The default additional frame length of 6 has resulted in a reserve of four local registers 324 for use by subroutine B, as previously described. The value of the frame pointer plus the frame length again designates the next available location in the stack.

The trap instruction is executed similarly to the call instruction. Unlike the call instruction, however, no register address is provided by x register code. The status register is loaded into the stack register addressed by the value of the frame pointer plus the frame length modulo 64 and the program counter is loaded into the stack register addressed by the value of the frame pointer plus the frame length plus 1 modulo 64. The frame length is set to a default value of 6. When the subprogram jump is taken the subprogram entry address specified by an address byte is placed in the program counter and a supervisor mode flag (not relevant for the present invention) in the status register is set.

The corresponding Pascal representation is

PC := entry address
-- jump in entry table
Register (FP+FL) ∧ := SR old
-- status of SR before trap instruction.
Register (FP+FL+1) ∧ := PC old
-- return address
FP := FP+FL
FL := 6
Supervisor-mode-bit := 1

The trap instruction also executes in three cycles.

A frame instruction is required for several functions; decrementing the frame pointer to include past parameters in the local register addressing range, resetting the frame length to the actual number of registers needed for the current stack frame, and default reservation of ten registers to execute further call or trap instructions. Upon initiation of the frame instruction in the present invention, the frame pointer is decremented by the value of the y register code in the instruction and the value of the frame length is replaced by the value of the x register code. The difference between the number of free registers and the required registers plus ten (free registers—(required registers+10)) is calculated and placed in bits 8 through 2 of the difference counter. As previously described, bits 1 and 0 are set to 0. If the difference, K, is not negative, the required local registers plus the reserve ten registers are available in the register portion of the stack and the frame instruction is complete. If the difference is negative, a temporary memory pointer, MPtemp, is calculated as MPtemp := MP−K. Because the difference is negative, MPtemp is greater than MP.

MPtemp is then compared with the upper bound of the memory stack. If MPtemp is higher than the upper bound which would result in overflow of the memory portion of the stack while saving stack registers, the frame pointer and frame length are reset to their old values. The value of the memory pointer remains unchanged and a trap to a specific error handling subprogram designating frame error occurs.

If the upper bound of the stack is not exceeded, the number of registers from the register portion of the stack equal to the evaluated negative difference in the difference counter are stored to the memory portion of the stack beginning with the first stack register, addressed by bits 7 through 2 of the memory pointer, being stored to the location addressed by the memory pointer. The memory pointer is then incremented and the following registers from the stack are stored into the locations addressed by the incremented memory pointer. In a 32-bit word configuration such as the present embodiment with single byte (8 bit) memory storage, the memory pointer is incremented by four bytes for storage of each register. The difference counter is also incremented by four bytes concurrently until a value of 0 is reached signifying completion of the instruction.

The default value of ten registers is selected in the present embodiment based on the following requirements. A call or trap instruction embedded in the subroutine would require six registers. As previously described, a following jump to a subprogram caused by an exception requires an additional two registers, and the frame length is set to two employing the second default value in multiplexer 254 and a frame error as described above caused by execution of a frame instruction in an exception handler uses the remaining two registers. The corresponding Pascal representation for the frame instruction reads:

FP := FP-y register code
FL := x register code
K[8 .. 2] := MP[8 .. 2] + (64 − 10) − (FP + FL)
K[1 .. 0] := 0
-- 64 equal number of stack registers
-- 10 equal reserve.
If K > =0, then next instruction
-- instruction is finished if K not negative.
MPtemp := MP − K
-- MPtemp > MP because K is negative.
If MP > UB, then
FP := old FP
FL := old FL
-- trap on frame error
-- overflow of memory part of the stack repeat
20 Memory MP∧ := stack register MP[7 .. 2] ∧
-- save stack registers in memory part of the stack
MP := MP + 4
K := K + 4
until K = 0.

Figure 3C:
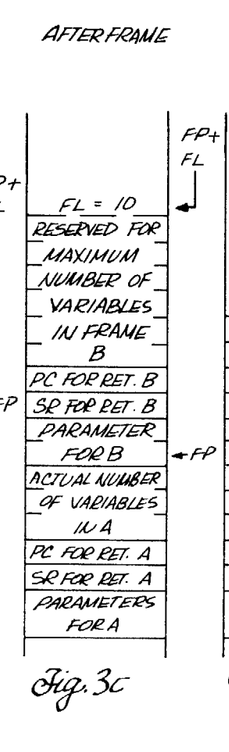
FIG. 3C is a representation of the stack register bank after a frame instruction in the present invention.

The configuration of the stack after completion of the frame instruction is shown in FIG. 3C. A frame length of 10 which is the default value is shown, which increases the number of reserve variables for frame B in locations 324 from 4 to 6. As previously noted, if the x register code had designated a longer frame length, additional locations for the maximum number of variables in frame B would be provided. As shown by the example in FIG. 3A for subroutine A where a frame length of 13 was specified.

The frame pointer has been decremented by two locations to incorporate the parameters passed by the A subroutine to the B subroutine into the B stack frame.

Return of control from a subroutine to the calling routine is accomplished by the return instruction. In the present invention, the contents of the register addressed by the y register code is loaded into the status register and the contents of the following register addressed by incrementing the y address register is loaded into the program counter.

A determination of whether the restored stack frame is fully contained in the register portion of the stack is made by comparing the contents of the frame pointer expanded to 32 bits with the contents of the memory pointer. If the expanded contents of the frame pointer does not point to a location in the memory stack indicated by a lower value in the frame pointer than the memory pointer, the restored stack frame is fully contained in the register portion of the stack. Based on the architecture as previously described with the maximum difference of 64 between the memory pointer and the expanded frame pointer, it is sufficient to compare bits 8 through 2 of the memory pointer with the frame pointer. As previously described, the memory portion of the stack equals the 64 registers of the hardware register portion of the stack.

In the present architecture, the comparison is accomplished by placing the difference FP − MP[8 .. 2] into the difference counter (K[8 .. 2], K[1 .. 0] = 0). If the difference counter is not negative, the current stack frame is fully contained in the register portion of the stack and the return instruction is complete. A negative value in the difference counter indicates the number of registers which must be pulled from the memory portion of the stack.

Similar to the call instruction, a temporary memory pointer, MPtemp, is calculated as MPtemp: = MP + K. MPtemp is then compared with the lower bound of the memory stack held in global register G17. If MPtemp is less than the lower bound, indicating an underflow condition, the old value of the memory pointer remains unchanged and a trap to a specific error handling subprogram designating a range error occurs. If MPtemp is not lower than the lower bound, MPtemp is loaded into the memory pointer. As previously described for the push operation in the call, the pull operation is accomplished by loading a number of 32 bit words into the register portion of the stack according to the value of the difference counter beginning with the first word addressed by MPtemp being stored to the stack register with the address indicated by bits 7 through 2 of MPtemp. MPtemp and the difference counter are then incremented by four bytes for further transfers until the difference counter equals 0 designating completion of the instruction.

The corresponding Pascal representation is
PC := register following y register
SR := y register
K[8 .. 2] := FP-MP[8 .. 2]
K[1 .. 0] := 0
If K > =0, then next instruction
-- instruction is finished if K is not negative.
MPtemp := MPtemp + K
-- MPtemp < MP because K is negative
If MP < UB go to trap
-- indicating range error
MP := MPtemp
repeat
Stack register MPtemp[7 .. 2] ∧ := MPtemp ∧
-- load memory part of the stack into the stack register
MPtemp := MPtemp + 4
K := K + 4
until K = 0.

Figure 3D:
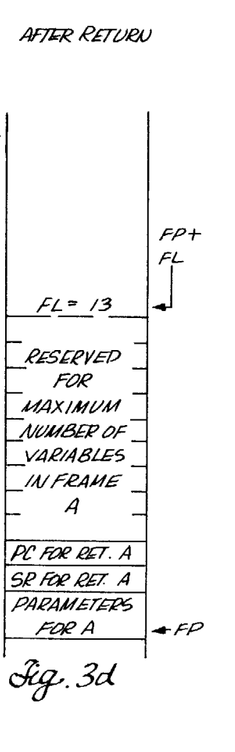
FIG. 3D is a representation of the stack register bank after a return instruction in the present invention.

Upon completion of the B subroutine, return to the A subroutine is accomplished, resulting in a configuration of the stack a shown in FIG. 3D. Restoring of the status register from stack location 320 has automatically reset the frame pointer and frame length to the values prior to the call. The next available location in the stack is once again defined by the frame pointer plus the frame length.

The final instruction indicative of the present invention is the set stack address instruction which expands the frame pointer to the length of the memory pointer and places the result in the register addressed by the x register code. The frame pointer itself remains unchanged. The expanded frame pointer address is the address where local register L0 would be stored in the memory portion of the stack. This algorithm assumes that the expanded frame pointer can only be equal to or higher than the address in the memory pointer between a range of 0 to 63 32-bit words. For evaluation of the expanded frame pointer address, bits 31 through 9 of the memory pointer, the frame pointer and two 0 bits are concatenated to a single 32-bit address. If bit 8 of the memory pointer equals 1, and the most significant bit of the frame pointer, bit 6, equals 0, a carry is added to bit 9 of the address for correction. The corresponding formula is x register := MP [31 .. 9]//FP//00+carry into bit 9
-- carry into bit 9 := (MP[8]=1 and FP[6]=0)
-- // signifies concatenation.

The set stack address instruction thus calculates the stack address of the current stack frame. Provided the stack address of a stack frame is saved, for example, in a global register, any data in the stack frame can then be addressed from within any younger generation stack frame by using the saved address independent of whether the data is located in the memory portion or register portion of the stack.

Load and store instructions may achieve this capability with a special stack address mode. The effective address is calculated from the stack address plus a displacement given in the memory instruction. The effective stack address is then compared with the memory pointer. If the effective stack address is lower than the value of the memory pointer, the address location is in the memory portion of the stack and a memory access occurs. If the effective stack address is equal to or greater than the memory pointer, the address location is in the register portion of the stack and is address by bits 7 through 2 of the effective stack address.

Having now described the invention in detail as required by the patent statutes, those skilled in the art will be able to make modifications in the invention to accomplish specific objectives or embodiments. Such modifications are included in the scope and intent of the invention as defined in the following claims.

I claim:

1. An apparatus for stack control during subroutine manipulation including call and return for implementation in a microprocessor comprising:
    a first plurality of separately addressable registers designated as the register portion of the stack wherein a current stack frame and a most recent stack frame reside;
    a first addressable memory having a portion designated as the memory portion of the stack for extending the stack by pushing values from the registers into the memory when the register portion of the stack for a stack frame is exhausted;
    an addressable program counter register containing the memory address of a current program instruction;
    an addressable memory pointer register indicating the topmost free address of the memory portion of the stack, the memory pointer incremented during a push of registers from the register portion of the stack and decremented during a pull of registers from the memory portion of the stack;
    an addressable status register containing the state of the computer for a current routine and incorporating a frame pointer which addresses the first register of the register portion of the stack for a stack frame whereby storage of the program counter and the status register in a new stack frame on a call to a new subroutine also stores the current frame pointer for the calling current routine in the same cycle and in the same valid state and upon return to the calling routine restores the frame pointer into the status register; and
    bus means interconnecting the registers and memory.

2. An apparatus as defined in claim 1 wherein the frame pointer in the status register of the called subroutine addresses the register in the register portion of the stack which is the next register beyond the number of registers currently in use in the stack frame of the calling routine not the maximum length of the stack frame of the calling routine thereby eliminating the requirement for a stack pointer.

3. An apparatus as defined in claims 1 or 2 wherein the frame pointer is at least one bit longer than the address range of the register portion of the stack.

4. An apparatus as defined in claim 3 wherein the frame pointer is seven bits long and further comprising means for expanding the frame pointer to a 32 bit stack address by concatenating the most significant 22 bits of the memory pointer with the frame pointer and two zeros in the least significant bits and incorporating a carry into bit 9 if the eighth bit of the memory pointer equals 1 and the most significant bit of the frame pointer equals 0.

5. An apparatus as defined in claim 4 further comprising:
    an arithmetic logic unit connected to the bus means for manipulating values contained in the registers and memory; and
    addressing means for the registers;
    and wherein the frame pointer is incremented or decremented by the addressing means whereby the arithmetic logic unit operates in parallel with incrementing of the frame pointer or addressing of the stack.

6. An apparatus as defined in claim 5 further comprising calculation means incorporating the arithmetic logic unit for checking the number of free registers in the register portion of the stack, comparing the number of registers required in the stack frame by a frame instruction and if insufficient registers are available pushing at least a number of registers equal to the insufficiency from the register portion of the stack to the memory portion of the stack.

7. An apparatus as defined in claim 6 wherein the number of registers pushed includes a reserve number of registers needed by a call instruction and two exception traps.

8. An apparatus as defined in claim 7 further comprising an addressable upper bound register for storing the address of the upper bound of the memory portion of the stack, the upper bound register accessible by the calculation means during the calculation of a register insufficiency and wherein the calculation means further checks for potential overflow of the memory portion of the stack.

9. An apparatus as defined in claim 8 wherein the calculation means upon indication of overflow causes the microprocessor to branch to an error handling subroutine prior to the push of registers from the register portion of the stack to the memory.

10. An apparatus as defined in claim 9 wherein the calculation means compares the memory pointer with the frame pointer in the restored stack frame upon a return to determine if the restored stack frame is fully contained in the register portion of the stack and if not fully contained therein, the calculation means causes a pull from the memory portion of the stack to the register portion of the stack of the number of registers not present in the register portion of the stack.

11. An apparatus as defined in claim 10 further comprising an addressable lower bound register containing the address of the lower bound of the memory portion of the stack and wherein the calculation means compares the number of stack registers to be pulled from the memory portion of the stack with the difference between the memory pointer and the lower bound of the stack for potential underflow.

12. An apparatus as defined in claim 11 wherein the calculation means inhibits the pull and causes the microprocessor to branch to an error routine upon potential underflow.

13. An apparatus as defined in claim 12 wherein the status register further includes a frame length which defines the number of registers in the current stack frame including the number of passed parameters plus the number of local variables plus the number of parameters to be passed.

14. An apparatus as defined in claim 13 wherein the frame length is 4 bits long and a value of 0 is interpreted as a value of 16.

15. An apparatus as defined in claim 13 wherein addressing of the beginning of a new stack frame not created by a subroutine call is determined as the sum of values in the frame pointer and the frame length.

16. An apparatus as defined in claim 13 wherein the calculation means includes an addressable difference counter register containing in bits 8 through 2 a value calculated as the sum of bits 8 through 2 of the memory pointer and the quantity comprising the number of registers in the register portion of the stack less the number of required reserve registers less the quantity comprising the value of the frame pointer plus the frame length, the two least significant bits of the difference counter equaling 0, whereby a value less than zero in the difference counter provides the push or pull count to the calculation means.

* * * * *

UNITED STATES PATENT AND TRADEMARK OFFICE
CERTIFICATE OF CORRECTION

PATENT NO. : 4,969,091
DATED : November 6, 1990
INVENTOR(S) : Otto Muller

It is certified that error appears in the above-identified patent and that said Letters Patent is hereby corrected as shown below:

Column 1, line 59, change "printer" to -- pointer --.

Column 11, line 39, before "Memory" delete "20".

Column 12, line 63, after "stack" change "a" to -- as --.

Column 13, line 10, change "nigher" to -- higher --.

Signed and Sealed this

Twenty-first Day of April, 1992

Attest:

HARRY F. MANBECK, JR.

*Attesting Officer*     *Commissioner of Patents and Trademarks*